UNITED STATES PATENT OFFICE.

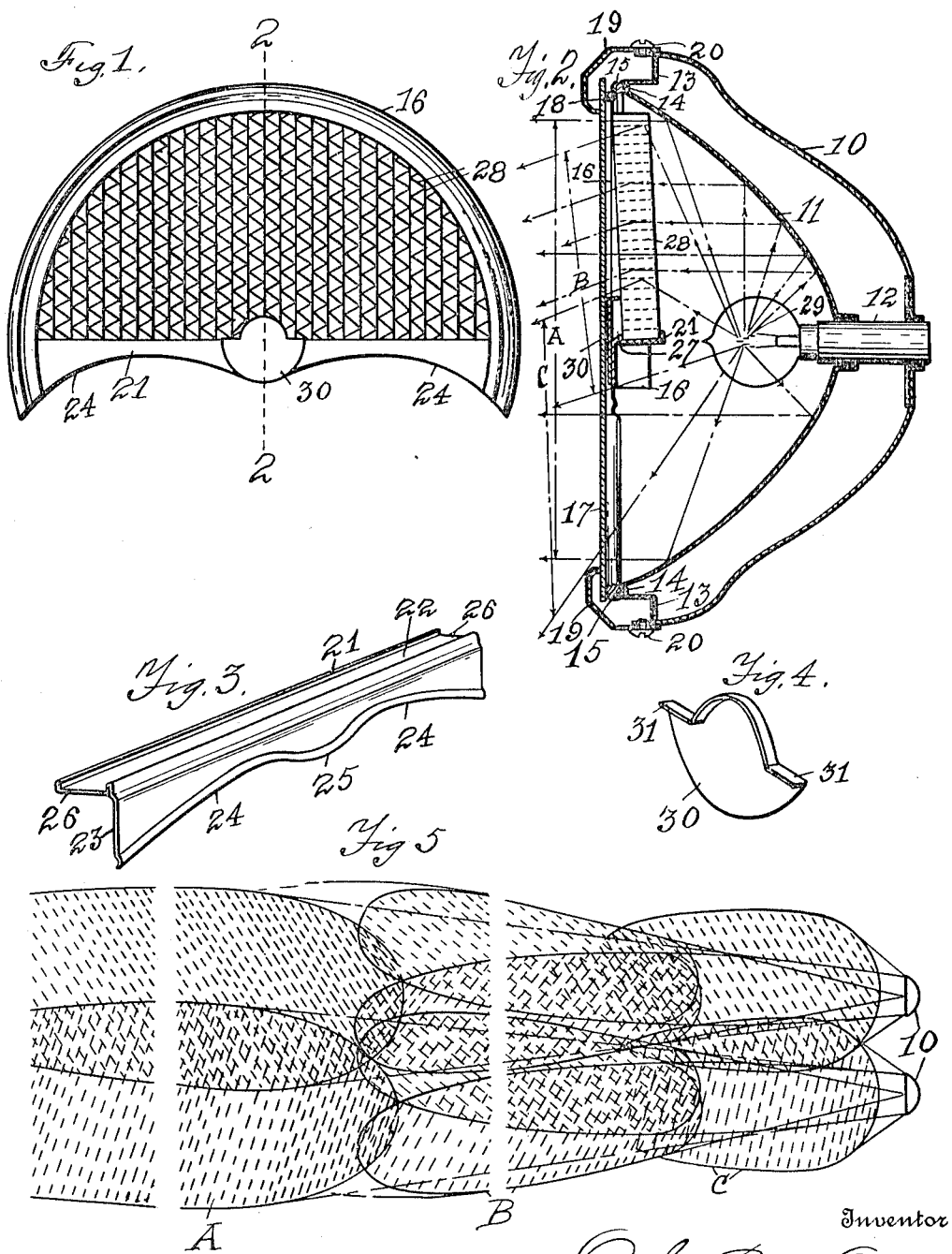

OTHO M. OTTE, OF JAMESTOWN, NEW YORK, ASSIGNOR TO RAYDEX MANUFACTURING COMPANY, OF BRACKENRIDGE, PENNSYLVANIA.

AUTOMOBILE-LAMP.

1,309,445.    Specification of Letters Patent.    Patented July 8, 1919.

Application filed January 2, 1918. Serial No. 209,904.

*To all whom it may concern:*

Be it known that I, OTHO M. OTTE, a citizen of the United States, residing at the city of Jamestown, in the county of Chautauqua and State of New York, have invented certain new and useful Improvements in Automobile-Lamps, of which the following, taken in connection with the accompanying drawings, is a specification.

The invention relates to lamps for vehicles and similar uses in which mechanism is provided to project and control the light; and the object of the improvement is to provide a lamp with a parabolic shaped reflector having means for controlling the rays of light so that a broad field in front of said light is divided into three areas, namely, a distance area, an intermediate area, and an area immediately in front of said light, which means consists of a light controlling vision intercepting screen and multiple reflector for the upper portion of the front of said parabolic shaped reflector, which combination screen-reflector consists of a series of vertically placed alternate flat and V-shaped angular corrugated strips of thin metal supported upon a diametral cross bar in a segmental rim which fits within said parabolic reflector, the vertical placing of the flat and corrugated sheets providing thousands of reflector surfaces which reflect the direct rays of light sidewise as well as. downward and broaden the field of light from the surfaces of said vertical corrugated and flat strips; and the invention consists in the novel features and combinations hereinafter set forth and claimed.

In the drawings, Figure 1 is a front elevation of the screen reflector in its segmental supporting rim. Fig. 2 is a vertical sectional view of the entire lamp with the vision screen and multiple reflector mounted therein in correct position and showing the path of the projected rays of light to the different areas by dotted lines. Fig. 3 is a perspective view of the cross bar for supporting the screen reflector in the segmental rim. Fig. 4 is a perspective view of the central plate which protects the vision of the bystander from the direct central ray of the light. Fig. 5 is a plan diagram of the three areas of the broad light field in front of a pair of lamps having my improved construction, two of the areas being broken away through their central portion.

Like characters of reference refer to corresponding parts in the several views.

The numeral 10 designates the parabolic reflector casing, and the numeral 11 the parabolic reflector. The casing 10 has a reflector 11 which is separated from said casing by means of the tubular lamp post 12, and the outwardly extending flanged rim 13 of the reflector 11 over which the front edge of the casing 10 is extended thereby providing a firm brace for said front edge of the casing 10.

A groove 14 is provided in the flanged rim 13 to receive therein the packing 15, against the upper two-thirds of which the segmental supporting rim 16 rests and the lower third of the packing 15 supports the glass 17. A second packing 18 is provided in a groove in the flanged rim of the segmental supporting rim 16 against which the glass 17 rests in the upper two-thirds of the front of the parabolic reflector 11, the flanged edge of the segmental supporting rim 21 resting against the packing 15 in said upper portion. The glass 17 is held in place upon the packing 15 by means of the rim 19 which is attached to the casing 10 by means of screws 20.

The segmental supporting rim 16 has a cross bar 21 which has a channeled upper surface 22 and a downwardly projecting angular front portion 23 which curves upwardly at 24 each side of the center 25. The cross bar 21 has the squared ends 26 which fit within and are butt-welded to the segmental supporting rim 16 to thereby hold the segmental rim 16 firmly in position with the channeled portion 22 somewhat to the rear of the front of the rim 16 as shown at 27 to give a downward inclination to the tubular openings in the screen 28.

The vision protecting screen and multiple reflector 28 is inclosed within the curved upper portion of the rim 16 and its straight lower side rests within the channel 22 of the diametral cross bar 21 and is attached thereto preferably by soldering thereby holding the screen reflector at a slight inward inclination as shown in Fig. 2. The screen reflector 28 is composed of alternate vertical flat and V-shaped corrugated strips of thin sheet metal which form tubular openings to pass most of the parallel rays of light reflected from the parabolic reflector 11. The slight downward inclination given to the screen reflector 28 causes the double reflected and direct rays from the light 29 mounted in the post 12 to be reflected downward, as shown in dotted line. It is apparent that the vertical placing of the V-shaped corrugated strips as well as the flat strips causes the direct rays of light from the light 29 to be reflected sidewise over a fairly broad light field. A central plate 30 is provided in the front of the main central direct rays from the light 29 to protect the vision of the passerby therefrom, which plate has the shoulders 31 which extend out over and are attached to the top of the cross bar 21.

In the plan diagram shown in Fig. 5, the broad field in front of the pair of lamps is divided into three over-lapping areas A, B and C, portions of the areas A and B being broken away to bring the plan view within the confines of the required dimension. The rays of light which produce these three areas are shown by dotted lines in Fig. 2 and are given the letters A, B and C corresponding to said areas. The areas A are farthest from the lamp, and the areas C are immediately in front of the lamps, while the areas B intervene between the areas A and C. As stated and shown, these areas overlap one another sufficiently to produce a comparatively even light. The area A is lighted by the parabolic reflector 11 which may be given any angle of inclination desired by adjusting the inclination of the lamp. The area B is lighted by the double reflected and direct rays from the light 29 which are reflected by the under surfaces of the vision protecting screen and multiple reflector 28, and the area C is lighted by the direct rays which pass through the open lower portion 32.

It will be readily understood that a large portion of the main parallel rays of light reflected from the parabolic reflector 11 will pass through the apertures of the vision protecting screen 28 and through the open lower portion 32 and that thus the area A will have the brightest light, while the portion C of the direct rays through the open lower portion of the lamp will rank next as to luminosity in the lighting of said areas, while the intervening area B will be less brightly lighted. While this is true the overlapping of the different portions renders the whole scheme of lighting pleasing to the eye of the occupants of the car or to the passerby and at the same time provides for the brighter lighting where it is most needed. It is also apparent that the sidewise reflection from the vertical placing of the V-shaped and flat corrugated strips, which are either plated or coated with bright reflecting material, throws the light widely upon lighted area.

The slight downward inclination of the vision protecting screen reflector 28 causes said screen to intercept a certain portion of the parallel rays which are reflected from the parabolic reflector 11 and give a second reflection of said intercepted rays downward upon the roadway in the intermediate area B, thereby assisting the direct rays of light in the illumination of said intermediate area. The vertical flat and corrugated strips which form the screen reflector with its thousands of inter-reflecting surfaces are made of such thin metal that the edges of said metal strips obstruct a very small per cent. of the parallel rays.

I claim as new:

1. In combination with a parabolic reflector and a source of light, a screen of semi-circular form having a cross-bar at its base and a semi-circular rim connected at its ends to the ends of the cross-bar, a series of parallel vertical spaced strips secured at their lower ends to the cross-bar and at their upper ends to the rim, said cross-bar having a channeled upper face in which the lower ends of the vertical strips are received, and a series of undulating strips arranged in the spaces between the vertical strips and having their upper ends secured to the rim and their lower ends received in the channel of the cross-bar and secured to the latter.

2. In combination with a parabolic reflector and a source of light, a screen of semi-circular form having a cross-bar at its base and a semi-circular rim connected at its ends to the ends of the cross-bar, a series of parallel vertical spaced strips secured at their lower ends to the cross-bar and at their upper ends to the rim, and a series of undulating strips arranged in the spaces between the vertical strips and secured at their upper and lower ends to the rim and cross-bar respectively.

3. In combination with a reflector, a glass covering the same, a screen arranged to the rear of the glass, and clamping means engaging the base of the screen to hold the latter bodily at an incline in front of the reflector and with the screen base spaced from the glass cover and inclined upwardly toward the cover and to enable removal of the screen at will.

4. In combination with a parabolic reflector, a semi-circular rim, a cross-bar carried by the rim and arranged to extend rearwardly of the front face of the rim, and a screen member secured to the rim and cross-bar so as to be held bodily at an incline to the front face of the rim.

5. In combination with a parabolic reflector and a glass covering the same, a rim secured between the glass and reflector, a cross-bar carried by the rim and extending rearwardly thereof, and a screen member secured to the rim and cross-bar so as to be held bodily at an incline to the front face of the rim.

6. In combination with a parabolic reflector, a semi-circular rim, a cross-bar secured to the ends of the rim, said cross-bar having its front and rear bent upwardly to form the sides of a channel, and a screen member secured between the rim and cross-bar and in said channel.

7. In combination with the reflector and glass cover of an automobile lamp, a screen having spaced strips, said screen having a base arranged in spaced relation to the glass cover and the source of light and extending upwardly at an incline toward the glass cover, and means to rigidly hold the screen in said inclined position.

In testimony whereof I have affixed my signature in the presence of two witnesses.

OTHO M. OTTE.

Witnesses:
H. O. SANDBERG,
I. E. NORDSTROM.